US010169606B2

(12) United States Patent
Bell et al.

(10) Patent No.: US 10,169,606 B2
(45) Date of Patent: *Jan. 1, 2019

(54) VERIFIABLE DATA DESTRUCTION IN A DATABASE (71) Applicant: International Business Machines Corporation, Armonk, NY (US)

(72) Inventors: John W. Bell, Lees Summit, MO (US); Robert Haas, Adliswil (CH); James S. Luke, Cowes (GB); John A. Ricketts, Lakeville, MN (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/197,251

(22) Filed: Jun. 29, 2016

(65) Prior Publication Data
US 2017/0132266 A1 May 11, 2017

Related U.S. Application Data (63) Continuation of application No. 14/938,071, filed on Nov. 11, 2015, now Pat. No. 9,892,276.

(51) Int. Cl.
*G06F 21/00* (2013.01)
*G06F 21/62* (2013.01)
(Continued)

(52) U.S. Cl.
CPC ........ *G06F 21/6227* (2013.01); *G06F 21/602* (2013.01); *G06F 21/6218* (2013.01);
(Continued)

(58) Field of Classification Search
CPC .................. G06F 21/554; G06F 21/86; G06F 2221/2105; G06F 2221/2129;
(Continued)

(56) References Cited

U.S. PATENT DOCUMENTS 6,731,411 B1 * 5/2004 Walforst ................ H04N 1/327
250/556
8,738,935 B1 * 5/2014 Brooker .............. G06F 21/6218
713/193

(Continued)

FOREIGN PATENT DOCUMENTS

CN          1980459      * 11/2005

OTHER PUBLICATIONS

Hoffman, C., "Definitely deleted: How to guarantee your data is truly gone before recycling old PCs and drives," PCWorld, May 16, 2014, (printed Oct. 8, 2015), 11 pages. http://www.pcworld.com/article/2155347/how-to-guarantee-your-data-is-truly-deleted-before-recycling-old-pcs-and-drives.html.

(Continued)

*Primary Examiner* — Gary S Gracia
(74) *Attorney, Agent, or Firm* — Peter J. Edwards (57) ABSTRACT A computing device may determine that a policy event to initiate data destruction for a first set of data has been triggered. The first set of data may be located on a first file. The computing device may delete, in response to the determining, a first security key used for decrypting the first set of data. The computing device may delete, in response to the determining, one or more transaction log entries associated with the first set of data. The one or more transaction log entries may include a copy of the first set of data. The one or more transaction log entries may be a part of a transaction log. The transaction log may be a second file that stores a history of each data change within the database.

15 Claims, 6 Drawing Sheets (51) Int. Cl.
*H04L 9/08* (2006.01)
*G06F 21/60* (2013.01)
*G06F 11/30* (2006.01)

(52) U.S. Cl.
CPC .......... *H04L 9/0861* (2013.01); *H04L 9/0891* (2013.01); *H04L 9/0894* (2013.01); *G06F 2221/2143* (2013.01)

(58) Field of Classification Search
CPC ..... G06F 2221/2143; G06F 2221/2151; H04L 63/1416
USPC ............ 726/7, 22, 24, 26, 27; 713/155, 165, 713/168, 170, 185, 193; 707/792, 812, 707/959, 966; 709/203, 205, 217, 219, 709/226; 380/277
See application file for complete search history.

(56) References Cited

U.S. PATENT DOCUMENTS

| | | | | |
|---|---|---|---|---|
| 8,793,457 | B2* | 7/2014 | Cannon | G06F 3/0623 711/112 |
| 8,918,651 | B2 | 12/2014 | Greco et al. | |
| 9,231,923 | B1* | 1/2016 | Cignetti | H04L 63/0428 |
| 9,258,120 | B1* | 2/2016 | Allen | H04L 9/0894 |
| 2004/0255169 | A1* | 12/2004 | Little | G06F 21/30 726/17 |
| 2006/0063594 | A1* | 3/2006 | Benbrahim | G07F 17/32 463/42 |
| 2006/0143443 | A1* | 6/2006 | Cohen | G06F 11/1448 713/158 |
| 2007/0057099 | A1* | 3/2007 | Kubo | B02C 18/0007 241/101.2 |
| 2007/0063082 | A1* | 3/2007 | Coleman | B02C 18/0007 241/101.2 |
| 2007/0075168 | A1* | 4/2007 | Rodriguez | B02C 18/0007 241/36 |
| 2008/0088873 | A1* | 4/2008 | Chihara | G03G 21/046 358/1.15 |
| 2008/0148042 | A1* | 6/2008 | Brown | H04L 63/0442 713/154 |
| 2008/0177802 | A1* | 7/2008 | Haye | G06F 11/1448 |
| 2008/0177811 | A1* | 7/2008 | Cannon | G06F 3/0623 |
| 2009/0092252 | A1* | 4/2009 | Noll | H04L 9/083 380/277 |
| 2009/0147292 | A1* | 6/2009 | Shimura | H04N 1/00854 358/1.14 |
| 2009/0260088 | A1* | 10/2009 | Quach | H04M 1/66 726/26 |
| 2010/0257351 | A1* | 10/2010 | O'Connor | H04L 9/0894 713/150 |
| 2011/0270748 | A1* | 11/2011 | Graham, III | G06Q 20/102 705/40 |
| 2012/0093318 | A1 | 4/2012 | Obukhov et al. | |
| 2012/0260349 | A1* | 10/2012 | Nagai | G06F 21/44 726/28 |
| 2012/0278564 | A1 | 11/2012 | Goss et al. | |
| 2013/0124569 | A1* | 5/2013 | Richter | G06F 17/30082 707/792 |
| 2013/0268740 | A1* | 10/2013 | Holt | G06F 21/00 711/163 |
| 2014/0059355 | A1* | 2/2014 | Schuette | G06F 21/6218 713/189 |
| 2014/0109238 | A1* | 4/2014 | Ravindran | G06Q 10/0635 726/27 |
| 2014/0136577 | A1* | 5/2014 | Cherel | G06F 21/6227 707/813 |

OTHER PUBLICATIONS

Unknown, "Does Deleting Encryption Key Destroy Data?," Microsoft SQL Server, Forums, printed on Oct. 8, 2015, 2 pages, © 2015 Microsoft. https://social.msdn.microsoft.com/Forums/sqlserver/es-ES/466950ea-a71d-4f78-b868-8987384e40d8/does-deleting-encryption-key-destroy-data?forum=sqlreportingservices.

"Talk:Disk encryption," Wikipedia, the free encyclopedia, printed Jun. 7, 2016, 4 pages. https://en.wikipedia.org/wiki/Talk:Disk_encryption#Removal_of keys_is_not_secure_data_destruction.3F.

Bell et al., "Verifiable Data Destruction in a Database," U.S. Appl. No. 14/938,071, filed Nov. 11, 2015.

List of IBM Patents or Patent Applications Treated as Related, signed Jun. 29, 2016, 2 pages.

* cited by examiner

| Column A | Pointer |
|---|---|
| Allen | Record 2 |
| Baldwin | Record 4 |
| Branson | Record 3 |
| Olson | Record 1 |

502A

| Record ID | Column A | Column B | Column C | Column D | Column E | Column F | Column G |
|---|---|---|---|---|---|---|---|
| Record 1 | Olson | | | | | | |
| Record 2 | Allen | | | | | | |
| Record 3 | Branson | | | | | | |
| Record 4 | Baldwin | | | | | | |

| Column A | Pointer |
|---|---|
| Allen | Record 3 |
| Branson | Record 3 |
| Olson | Record 1 |

502A

| Record ID | Column A | Column B | Column C | Column D | Column E | Column F | Column G |
|---|---|---|---|---|---|---|---|
| Record 1 | Olson | | | | | | |
| Record 2 | Allen | | | | | | |
| Record 3 | Branson | | | | | | |

VERIFIABLE DATA DESTRUCTION IN A DATABASE

BACKGROUND

This disclosure relates generally to database management systems, and more specifically, to verifying data destruction within a database.

Database manager modules may perform the two functions of reading and modifying data within a database. Database managers may read data by selecting and delivering particular database records or values requested by a user based on a query statement. The query statement specifies the particular attributes (e.g., columns), table, and query conditions that a user desires. Database managers may modify data by inserting new database records (rows) in a table, updating values within the database records, or deleting particular database records from a table matching specified query conditions. A transaction may include one or more of these operations. The data that is read or modified may be located within a data file.

When the database manager reads or modifies data within a data file (e.g., source database file), the database manager may also write or copy corresponding data to additional files. For example, when a database transaction is initiated and completes, the database manager may write to a transaction log file. A transaction log records a history of changes made to a data file. For example, when a user issues a query to "update" a value, the database manager may update the value by changing the value to a new value within a source database but still maintain the old value within the transaction log. Transaction log files may be useful in case data needs to be recovered.

The database manager may further write information to a snapshot file (e.g., sparse file) or backup file. A snapshot is a read-only, static view copy of a database data file as the data file existed at a particular point in time. For example, a snapshot may be a copy of database (or records) as the database existed 2 weeks prior to a current date. Accordingly, a snapshot may restore old database values that existed at some time (e.g., clock time) prior to the current time. Snapshots of databases may be taken each time a change is made to a data file or on a periodic basis for reporting purposes or when data is changed by mistake. A full database backup file provides a complete archive of a database as it existed at the time a backup operation finished, which may be useful when hardware disasters occur.

SUMMARY

One or more embodiments are directed to a computer-implemented method, a system, and a computer program product for verifying data destruction in a database. A computing device may determine that a policy event to initiate data destruction for a first set of data has been triggered. The first set of data may be located on a first file. The computing device may delete, in response to the determining, a first security key used for decrypting the first set of data. The computing device may delete, in response to the determining, one or more transaction log entries associated with the first set of data. The one or more transaction log entries may include a copy of the first set of data. The one or more transaction log entries may be a part of a transaction log. The transaction log may be a second file that stores a history of each data change within the database.

While embodiments described herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database management systems, more particular aspects relate to verifying data destruction within a database. While the present disclosure is not necessarily limited to such applications, various aspects of the disclosure may be appreciated through a discussion of various examples using this context.

In order to ensure the security of a data file, the data within the data file may be encrypted via a security key (e.g., a private encryption key) to convert data plaintext into ciphertext. When a user requests data within the file, one or more security keys may be utilized to decrypt the data such that an authorized user may view or access the data in its plaintext form. In some situations, a user may desire to delete sensitive data by destroying a security key used for decryption. When a security key used for decryption is destroyed, the data remains in an indefinite encrypted state and consequently there may be no mechanism to decrypt the data. However, even though the data may remain in an encrypted state, the data may still nonetheless be located on the storage device (e.g., disk) and there may be a chance that an unauthorized user may have obtained the key before it was destroyed. Accordingly, the user may know what the associated hash represents and the algorithm utilized to decrypt the data.

In some situations, a user may desire to delete sensitive data by performing a delete operation query within a database. When data is deleted in a database via a delete operation, the data may be flagged as deleted (not actually overwritten) and pointers to the data may be deleted such that a query may no longer be able to access the data. However, the data may still be located within the data file on disk because the data may have never been overwritten. An unauthorized user may consequently try to rebuild the indexes or pointers to activate a query or utilize some other unauthorized method to access the data that was never deleted.

Even if data were to be overwritten within a database data file (e.g., a source database file), that data may not necessarily be deleted from other files associated with the database. For example, if a database manager deleted data from a data file, the data may not be deleted from a transaction log, a snapshot, or a full backup file. Therefore, an unauthorized user may still try to access the transaction log, snapshot, and/or full backup files in order to view potentially sensitive data. Accordingly, embodiments of the present disclosure are directed to verifying complete data destruction within database by at least determining that a policy event to initiate data destruction for a first set of data has been triggered, deleting, based on the policy event, one or more security keys associated with the first set of data, and deleting, one or more transaction log entries, snapshots, and/or backup files associated with the first set of data.

Figure 1:
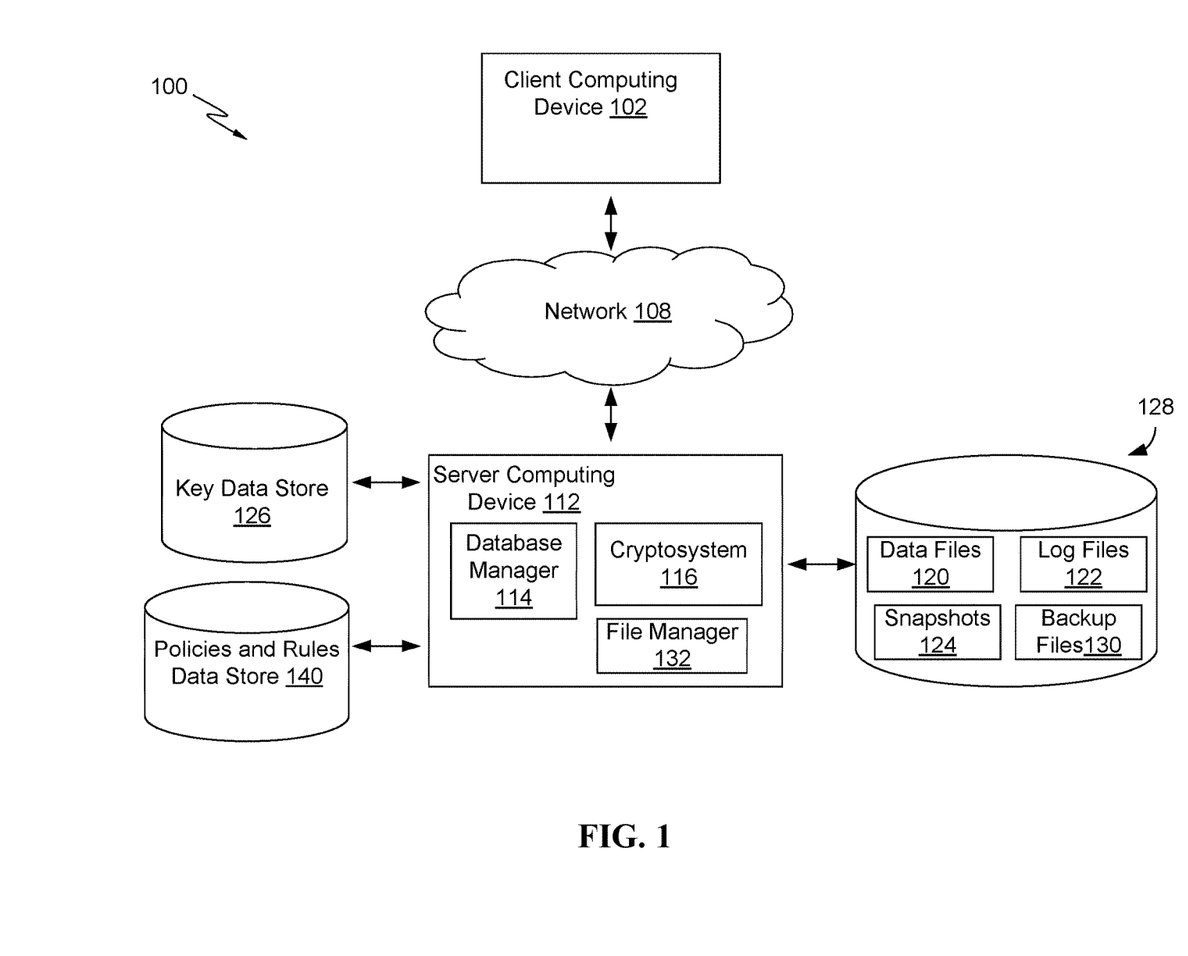
FIG. 1 is a block diagram of a computing environment, according to embodiments.

FIG. 1 is a block diagram of a computing environment 100, according to embodiments. The computing environment 100 may include a client computing device 102, one or more server computing devices, such as server computing device 112 and a network 108. In some embodiments, the server computing device 112 may have access to a storage device 128 (which includes various data files 120 (e.g., primary or source database files), transaction log 122, snapshots 124, backup files 130), a policies and rules data store 140, and/or a key store 126, as described in more detail below. In some embodiments, the data files 120, the transaction log 122, the snapshots 124, and/or backup files 130 may be stored to separate storage devices. In some embodiments, the computing environment 100 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 6:
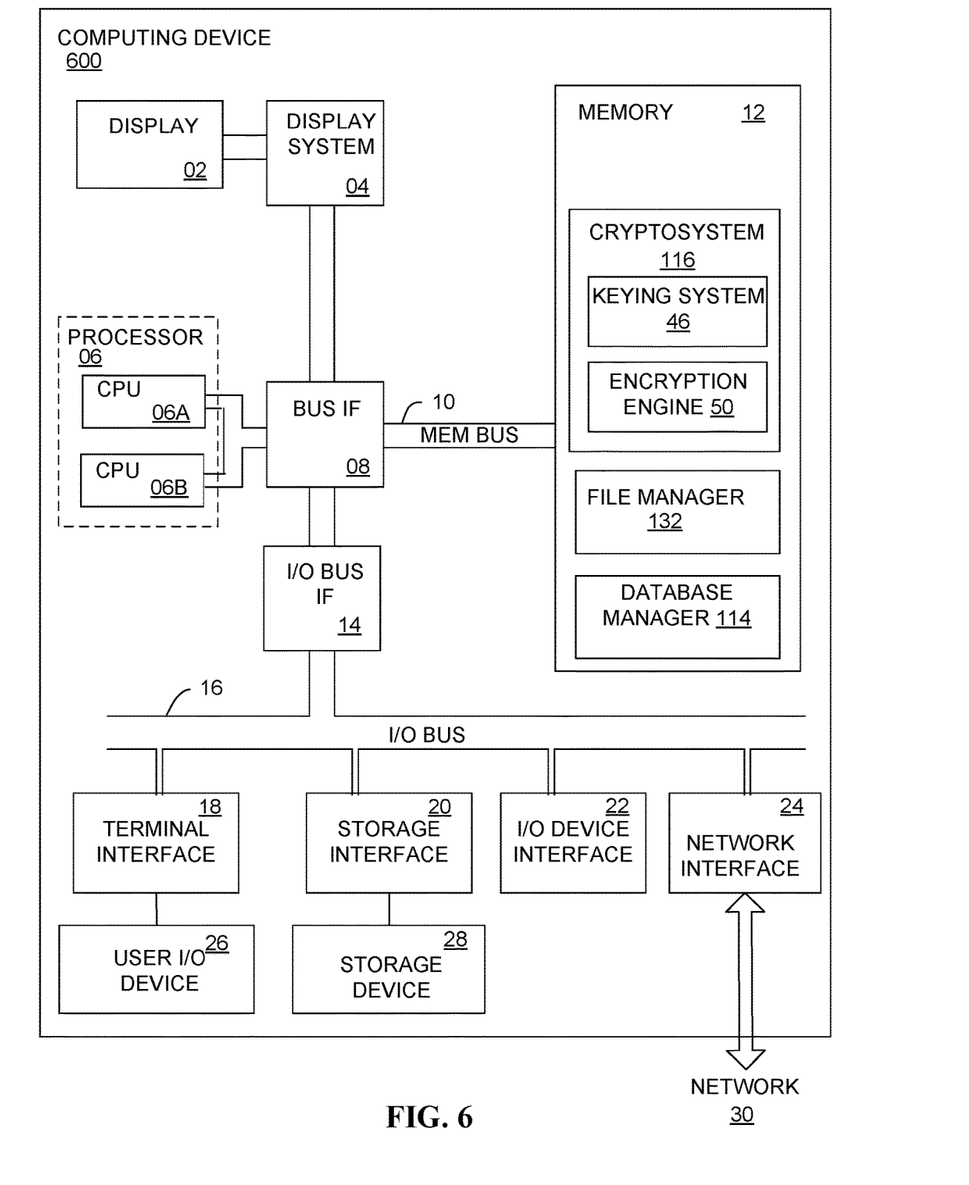
FIG. 6 is a block diagram of a computing device 600 that includes the cryptosystem 116, the file manager 132, and the database manager 114 of FIG. 1, according to embodiments.

Consistent with some embodiments, the client computing device 102, and/or the server computing device 112 may be configured the same or analogous to the computing device 600, as illustrated in FIG. 6. In some computing environments 100, more or fewer servers may be present than illustrated in FIG. 1 to perform various embodiments. In some embodiments, each of the data stores (i.e., 128, policies and rules data store 140, and key data store 126) may be individual servers (e.g., database servers).

The client computing device 102 and/or the server computing device 112 may communicate with another via any suitable network 108. For example, the network 108 may be a local area network (LAN), a general wide area network (WAN), and/or a public network (e.g., the Internet).

The server computing devices 112 may be any suitable servers consistent with embodiments of the present disclosure. For example, the server computing device 112 may be physically configured as a blade server, rack server, a cloud server, etc. Types of server hosting may include shared, virtual, clustered (e.g., Network Attached Clustered Storage Systems), and cloud systems or any other hosting. Server application types may include web servers (e.g., Apache web servers), application servers, specialized servers such as file, printer and database servers (e.g., MySQL servers), media and mail servers, etc. As illustrated in FIG. 1, the server computing device 112 in some embodiments may include a file manager 132, a database manager 114, and a cryptosystem 116. As described in more detail below, the file manager 132 may be responsible for handling security keys, writing metadata to the key store 126 (or files), and/or determining whether a policy has been triggered via the policies and rules data store 140. The database manager 114 may be responsible for interacting with the various files as found within the storage device 128. The cryptosystem 116 may include a keying system for encrypting and/or decrypting data and an encryption engine for providing various ciphertext algorithms, as described in more detail below.

The policies and rules data store 140 may include a description of each policy event required to initiate data destruction for a set (i.e., one or more) of data. A policy event may be based on a date, a time, and/or an occurrence of a particular incident, as described in more detail below. The key data store 126 may store various security keys utilized for encrypting and/or decrypting various sets of data (e.g., a record) and/or entire files. In some embodiments, the key data store 126 may further include additional information about security keys and/or a data destruction event, which may effectively be an audit trail. For example, the data store 126 may include various meta data information about the security keys, such as a time of when one or more security keys were deleted, the policy event that initiated the deleting of the one or more security keys (e.g., as found in the policies and rules data store 140), and a witness signature. A "witness signature" as described herein may be a mark that a user generates in order to verify the data destruction of a set of data. The "mark," for example may be an electronic signature (e.g., E-signature), and/or include one or more characters, letters (e.g., user initials), numbers, sounds, and/or symbols in digital form attached or logically associated with a set of data that will be deleted. Such mark may further identify and authenticate a particular user as the source for verifying data destruction and indicate such user's approval of the data destruction. In some embodiments, the information about a data destruction event may be located in a different dedicated data store other than the key data store 126. For example the information may be included within the storage device 128, within a data store associated with a computing device different than the computing device 112, or any other location.

In some embodiments, the security keys themselves may be stored within the storage device 128 (or any location), in addition or opposed to the key data store 126 as illustrated in FIG. 1. Storing the security keys within a separate data storage device (e.g., key data store 126) in addition to or instead of the storage device 128 may offer various advantages. For example, if a storage device (e.g., storage device 128) includes both a set of data and a security key for decrypting the set of data and the security key becomes faulty (e.g., the security key is not decrypting the set of data), then the data may remain in an indefinite encrypted state. However, if the security key is stored to both a first storage device and a second storage device (which also has data files), if the security key within the second storage device becomes faulty, then the first storage device (e.g., key data store 126) may be utilized as a type of backup to restore the security key. In some embodiments, the key data store 126 may be utilized as a general type of backup for security keys in case the system or user accidently deletes a security key. For example, if the storage device 128 included a copy of a first security key, and the security key was also located within the key data store 126, and a user wrongfully deleted the first security key within the storage device 128, then the system may utilize the first security key within the key data store 126 to restore the security key for decrypting/encrypting data.

In some embodiments, depending on the file system, each database record or column may be associated with its own security key. Accordingly, for example, in order to decrypt a particular record, the security key for that database record may need to be utilized. Accordingly, the key data store 126 may in some embodiments store database record level security keys by storing a record identifier (e.g., RID, Relative Record Number, primary key, etc.) of the security key associated with the record along with the security key itself and file identifier (e.g., found in a Superblock of the file). In other embodiments, a file may be associated with a single security key such that all of the database records are decrypted using the single security key. In these embodiments, the key data store 126 may only store the security key and the corresponding file identifier.

The data files 120 may be any suitable data file type consistent with various file systems that contain structured data (e.g., database files). The file systems may be disk file systems, flash file systems, tape file systems, virtual file systems, network file systems, shared disk file systems, flat file systems, or any other file system consistent with various operating systems. In some embodiments, the data files 120 may include metadata blocks that store security keying information for each node that has a different encryption policy. In some embodiments, the keying information is stored in a dedicated data store or on a separate server computing device.

Figure 2:
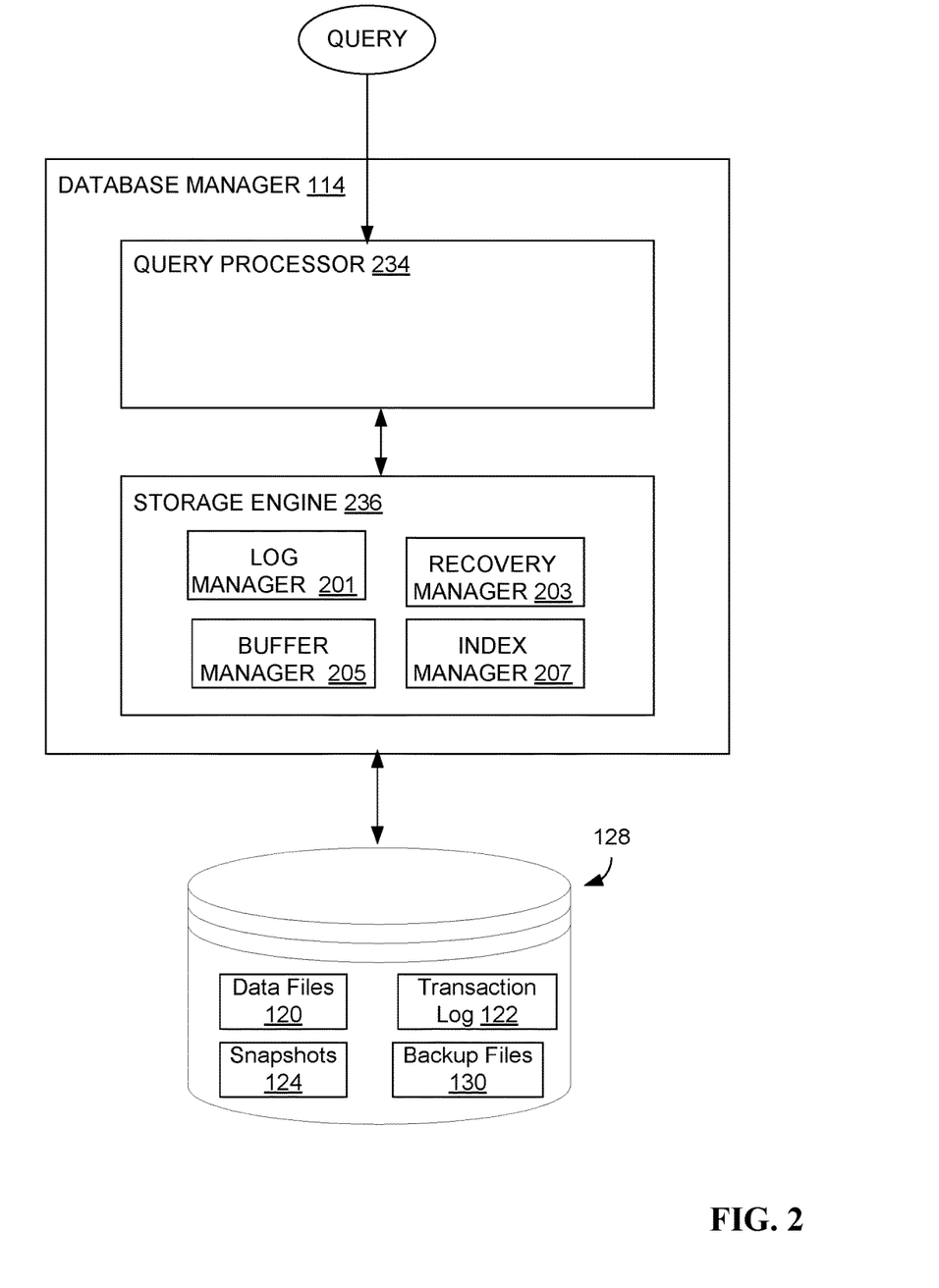
FIG. 2 is a block diagram of the database manager of FIG. 1, according to embodiments.

FIG. 2 is a block diagram of the database manager 132 of FIG. 1, according to embodiments. In an embodiment, the database manager 132 may include a query processor 234 and a storage engine 236, which may interact with a one or more files (e.g., data files 120, transaction log 122, snapshots 124, and/or backup files 130) within a storage device 128. In some embodiments, the data files 120, transaction log 122, snapshots 124, and/or the backup files may be located in-memory in a volatile memory device (e.g., Random Access Memory (RAM)) instead of or in addition to non-volatile storage (e.g., storage device 128). Further, the components (e.g., query processor 234) within the database manager 132 are by way of illustration and therefore there may be more or less components within the database manager 132 as illustrated.

In various embodiments, these components and data are operable to receive a query request and/or determine that a policy event to initiate data destruction for a first set of data has been triggered, the first set of data located on a first file. The components and data may also be operable to delete, based on the query or policy event, one or more security keys associated with the first set of data. Moreover, the components and data may be operable to delete one or more transaction logs, snapshots, and/or backup file entries associated with the first set of data.

Consistent with some embodiments, a user may issue a delete operation query request or data destruction query request in order to delete destroy data. In some embodiments, however, the delete request may not be a query delete request, but a standard operating system request to permanently delete data to free up disk space to be overwritten by other write operations. The query may be written in any suitable query language that corresponds to the database type. For example, the query request may be written in structured query language (SQL) for relational databases, data manipulation language (DML) for inserting, updating, or deleting database records in relational databases, multi-dimensional expression (MDX) for multidimensional or online analytical procession (OLAP) databases, online transactional processing databases (OLTP), or any other language for any other database.

In an embodiment, the database manager 132 may initiate the process of selecting the one or more database records or values that are being requested from the query request by utilizing the query processor 234. In some embodiments, the query processor 234 may generate several plans to access values and execute the most efficient plan, as explained further below. Alternatively, the query processor 234 may generate an efficient plan, which is not necessarily the most efficient. The query processor 234 may include such components as a compiler, a parser engine, an optimizer engine, and an execution engine. A compiler may receive the query request and convert the query request into machine-readable object code.

The parser engine may receive the compiled query request and check that the query request is correctly specified, resolve names and references, and convert the query request into a format utilized by the optimizer engine. The parser engine may convert the query request into a data structure, which gives a structural representation of the query request. For example, the data page may be an abstract syntax tree, parse tree, or other data structure. In various embodiments, the parser engine may make a plurality of checks, including a syntax check, a check determining whether the query request is meaningful (e.g., whether objects and columns in the query request exist), and a shared pool check.

In various embodiments, the optimizer engine receives the parsed query request and in response determines an efficient or most efficient query execution plan for selecting the one or more values based on which values are requested in the query request. This may occur by determining the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query request is executed and the results produced. In an embodiment, the execution engine receives an efficient or most efficient query execution plan according to the optimizer engine, and executes the query against the read-only data structure 210 to find the requested values and against the append-only data structure 212 to insert corresponding records. The execution engine may also order tables in any particular join order according to any join method, which is chosen by the optimizer engine. For example, the execution engine may run a nested loop, sort merge, or hash method as the join method chosen by the optimizer engine.

In various embodiments, the storage engine 236 utilizes the chosen query execution plan from the query processor 234 to select one or more database records or values from the files (e.g., transaction log 122) within the storage device 128. In some embodiments, the storage engine 236 is a part of the execution engine of the query processor 234. The storage engine 236 provides an interface between low level data stored in the storage device 128 and higher level applications. The storage engine 236 may interface with the data files by translating various query requests into low-level file system commands.

The log manager 201 of the storage engine 236 may be responsible for writing every transaction change associated with the data files 120 into the transaction log 122 (also known as a journal log, journal receiver, database log, binary log, etc.). The transaction log may correspond to a different dedicated file than a data file 120 (the data file storing a table of values) that stores a history of each data change within the database. The transaction log may also include a copy of data as found within the data files 120. Specifically, a transaction log may be a series of sequentially ordered records or entries (e.g., Log Sequence Numbers (LSNs)) that records the beginning of a transaction (e.g., via a transaction ID and begin time), all the changes made in the data files 120 associated with the transaction, and the final commit (e.g., demonstrated by commit time or time stamp) or rollback of the transaction. A transaction is one or more operations that make up a unit of work performed against a storage device 128 or memory. For example, a transaction may include a Log Sequence Number (LSN) that includes the I/O operations of deleting a value within the data files 120, and updating a corresponding record with a new value within the data files 120. The transaction log 122 may not be viewable by a user. The data files 120, however, may conversely be viewable by a user and contain the most updated version of a set of values, as opposed to a history of changes of those values.

In various embodiments, a transaction may be in multiple states. For example, the transaction may be in an active state (uncommitted state). In an active state, a transaction has begun and is currently being executed, which may be the initial state of every transaction. The transaction may also be in a partially committed state (uncommitted state). In a partially committed state, a transaction may execute its final operation without performing various checks (e.g., the consistency state of a data page after applying output of the transaction on the data page). Moreover, the transaction may be in a committed state. If all operations are executed successfully, which includes successfully performing various checks, then the transaction may be in a committed state. Accordingly, all of the committed transactions may permanently be applied to the data pages within the storage device 128 or memory. The transaction may also be in a failed state (uncommitted state). In an uncommitted state, some operations may be performed while others are not finished. In some systems, when data is recovered, all committed transaction are rolled forward to recreate a database and all uncommitted transactions are rolled back.

In some embodiments, and as described in more detail below, the log manager 201 or other component may delete one or more transaction log entries associated with a first set of data in response to a user request or policy event triggering.

The recovery manager 203 may be responsible for generating snapshots 124 and/or backup files 130. A snapshot in some embodiments is a read-only, static view of a database data file as it existed at a particular point in time minus any uncommitted transactions. When data is modified within the data files 120, a copy-on-write operation of the data may be performed to copy the data to a sparse file or append-only file to generate a snapshot. For example, as soon as a "delete" operation is performed, the values as they existed before the deletion may be written to a sparse file. The backup files 130 may be full backup versions of data stored on disk at particular time intervals. For example, at the end of every day, the data from the data files 120 may be copied to corresponding backup files 130, which may be stored on a separate disk, other than the storage device 128.

In some embodiments, and as described in more detail below, the recovery manager 203 may delete one or more entries within a snapshot or backup file that is associated with a set of data located within the data files 120. As disclosed herein, a "set of" may mean "one or more."

The index manager 207 may be responsible for building and/or rebuilding indexes within the data files 120. An index is a data structure that organizes data for a particular column within the data files 120. In some embodiments, indexes may include a copy of the data as found within the data files 120, each record of the data files 120 corresponding to an entry within an index. The index may help the database manager 114 to efficiently retrieve records or values for particular columns by organizing the values in a particular manner (e.g., alphabetically). Indexes that are utilized to access data may be a hash-based index, or a tree-based index such as a B+ tree. Indexes may also be clustered, non-clustered, primary, secondary, dense, sparse or configured in any other manner. In an alternative embodiment, a full table scan may be utilized such that database records are read one at a time until the desired database records are selected. In other embodiments, the index may be an offset from a starting table location based on the size of a database record multiplied by the number of database records.

In some embodiments, the index manager 207 may be utilized for rebuilding indexes on a second data file after data that will not be deleted is copied from a first data file to the second data file. The recovery manager 203 may start the process by copying entries of the snapshots 124 that do not need to be deleted to another data file. The recovery manager 203 may then extract index keys from database records according to the definition of indexes, and send the index keys along with Record Identification Numbers (RIDS) (or other identifier) to parallel sort tasks. In various embodiments, the index manager 207 may then rebuild the one or more indexes by receiving the sorted index keys after index keys have been extracted from database records of the data, and rebuild the indexes according to how the index keys are sorted. For example, the index manager 207 may receive the root node index keys, the intermediate level index keys, and the sorted leaf node level keys and generate a corresponding index by generating a corresponding root node, intermediate level, and leaf nodes for various columns of different tables. Consistent with some embodiments, the index manager 207 may finish the rebuilding of indexes before performing the "log apply" phase to retrieve log entries corresponding to the data that does not need to be deleted from the transaction log 122 to the data file.

The buffer manager 205 may be responsible for interfacing with the storage device 128 by reading the data from the storage device 128 into main memory. In various embodiments, the buffer manager 205 may select the one or more values from the different types of database data pages using various selection techniques. For example, the one or more database records may be selected from a database table data structure, and may have a RRN, as described above. In another embodiment, the data structure may be a simple file such as a binary large object (BLOB), or a character large object (CLOB). Alternatively, the data structure may be arrays with fixed-length entries, or a linked list. In an embodiment, the buffer manager 205 may utilize index data structures to access and select the corresponding set of database records, which groups database records together thereby making it easier for database record access. For example, the buffer manager 205 may directly interface with the data pages through a block device, such as a raw access storage device, wherein the buffer manager 205 bypasses the operating system's caches and buffers and accesses the set of values (also known as a disk block or physical record). Alternatively, the buffer manager 205 may select the set of values through a component of an operating system, called a disk manager, wherein the disk manager receives the low-level file system commands from the buffer manager 205 and manages disk space for storage in the storage device 128. In some embodiments, the database manager may not include the buffer manager 205, as a database may be in-memory and require no buffer pool.

Figure 3:
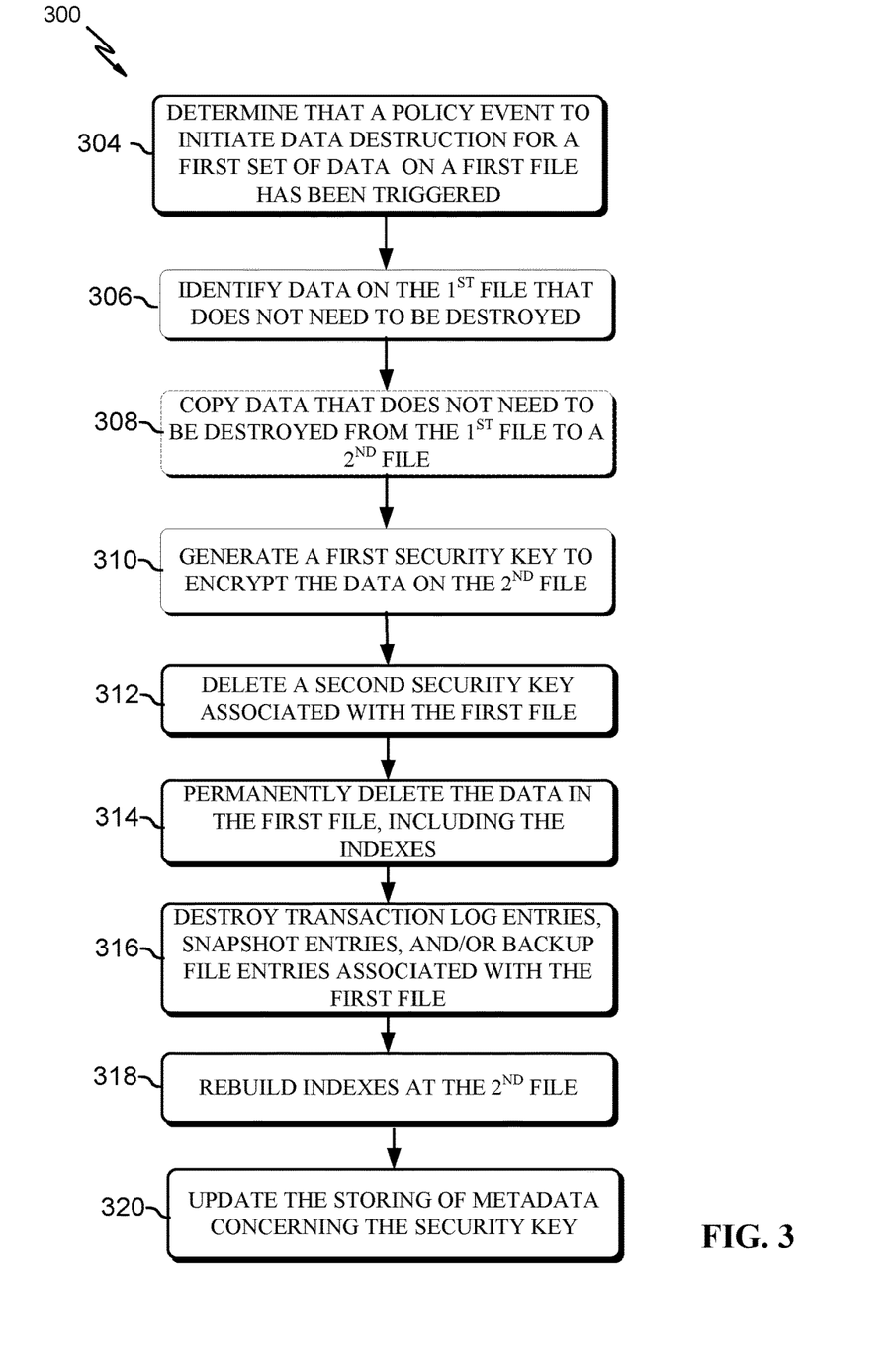
FIG. 3 is a flow diagram of an example process for providing verifiable data destruction, according to embodiments.

FIG. 3 is a flow diagram of an example process 300 for providing verifiable data destruction, according to embodiments. In some embodiments, the process 300 may begin at block 304 when the database manager determines that a policy event to initiate data destruction for the first set of data on the first file has been triggered. A "policy event" is a condition that may be required to be fulfilled in order to initiate data destruction, which may be based on various factors such as a date, time, and/or occurrence of a particular incident (e.g., event, action, sequence of actions, process, etc.).

In some embodiments, the initiating of data destruction may be based primarily on the triggering of the policy event without a user request. In an example illustration, an occurrence of a particular incident may be when a law enforcement investigation has become closed. In some embodiments, when a law enforcement investigation has been closed, a user or administrator may mark a corresponding database record or value as being closed. Consequently, the database manager may be notified of the closed law enforcement investigation, which may trigger a destruction of the database record or value (and/or corresponding log entries, snapshots, backup files, and security keys) without a user request to destroy the data. Initiating data destruction based on a date and/or time may be based on a specified amount of time the data (e.g., database records) is allowed to exist in a database. For example, a policy or rule may specify that all data that has existed for 3 years will be destroyed, at which point the policy event may be triggered (end of the 3 years). Moreover, initiating data destruction may be based on a clock time of day and/or night. For example, the policy event may include a rule to perform data destruction at 12 a.m. on a particular date. In some embodiments, the policy event may trigger data destruction of a first data file, but not necessarily a second corresponding file until a later time. For example, when a first policy event occurs, the database manager may immediately destroy data from a data file, but then wait 3 more months to destroy the corresponding data within a transaction log, sparse file, and/or backup files.

In some embodiments, a user may request to destroy (e.g., permanently delete) the first set of data as opposed to a system determining that a policy event to destroy the first set of data has been triggered. In some embodiments, the user request may include a request to destroy one or more security keys associated with the first set of data, a request to destroy the first set of data within a source data file, and a request to destroy the first set of data copied to other files (e.g., backup files). In some embodiments, the user request may be based on "delete" and/or destroy operations to delete the data via a query. In an example illustration, a customer user may desire to delete his or her database record that corresponds to cancelling his or her account and any other associated file that the database record may be located in. Therefore, the user may input a destroy operation within a query statement that specifies to destroy the database record within a data file and within any other file (e.g., transaction log) that includes a copy of the data. The statement may further specify to delete the security key that is used to decrypt the database record. In some embodiments, the policy event may be a user request to destroy the first set of data.

Per block 306, the database manager in some embodiments may identify data on the first file that does not need to be destroyed or deleted. The data on the first file that does not need to be destroyed may correspond to data that is not sensitive, is not requested, is not triggered by the policy event, etc. In an example illustration, the first file may include a table and the table may include various database records and columns. If a policy event and/or a request to destroy data caused a first record or column to be marked for destruction, the database manager may determine that every other column and/or record does not need to be destroyed and may therefore flag those columns and/or records in preparation for block 308.

Per block 308, and in some embodiments, in response to identifying data on the first file that does not need to be destroyed, the database manager may copy that data from the first file to a second file. For example, a first set of records on a first data file may be identified as not needing to be destroyed. The first set of records may accordingly be copied (e.g., copy-on-write) from the first data file to the second data file. In some embodiments, the data that does not need to be destroyed (or copy of the data) or the entire first file may be copied from an associated snapshot file, backup file, and/or applied from transaction log entries. For example, in response to a user request and/or a triggering of a policy event to initiate data destruction, the database manager may restore the most recent version of a database by utilizing a snapshot of the database and apply transaction log entries to the snapshot (or another file) to arrive at a particular point in time. The database manager may then permanently delete (e.g., overwrite) the data and/or associated file that was subject to the data destruction request and/or triggering policy event. In some embodiments, a snapshot of a database may not include the record or values that are subject to data destruction. In these cases, a snapshot of the entire database may be restored and each transaction log entry may be applied to the snapshot database except for the entry that corresponds to the data that is subject to data destruction.

Per block 310, a file manager may generate, in response to the copying the second set of data to a second file, a first security key. The file manager may then encrypt the data within the second file with the first security key. Encryption is the process of converting ordinary text (i.e., plaintext), into a form that is unreadable (i.e., ciphertext). Decryption reverses the encryption process by translating ciphertext into plaintext. A cipher is an algorithm used to perform a particular type of encryption and decryption. A security key (e.g., public key, private key, symmetric key, one of an asymmetric key pair, etc.) may be a set of particular parameters that guide the algorithm and encrypt or decrypt data.

The ciphertext algorithm that the file manager utilizes may be any algorithm for particular embodiments. For example, the encryption algorithm may be an asymmetric algorithm type, such as a Ribest-Shamir-Adleman (RSA), Diffie-Hellman (DH), Pretty Good Privacy (PGP) or other algorithms. The asymmetric algorithm may be utilized with asymmetric security keys. Asymmetric security keys may include private and public keys. Alternatively, the algorithm type may be a symmetric algorithm that is meant to be utilized with a symmetric security key. The symmetric algorithm may be any number of algorithms such as triple Data Encryption Standard (DES), International Data Encryption Algorithm (IDEA), Advanced Encryption Standard (AES), or other algorithms. For a symmetric security key algorithm, only one key is utilized to encrypt and decrypt tuple data.

Per block 312, a file manager or database manager may delete a second security key associated with the first file. Deleting a security key destroys or "zeroes out" the binary values that make up the security key such that the binary values are overwritten. In some embodiments, the binary values may be overwritten multiple times to ensure that the security key is destroyed. Consequently, if the security key is a key used for decryption, the data within the first file may remain permanently encrypted such that an unauthorized user may not be able to obtain the security key to decrypt the data on the first file after the security key has been deleted. In some embodiments, only one security key is destroyed for a given file because the one security key may be responsible for decrypting the entire file. In other embodiments, various security keys may be destroyed for a given file because the various security keys may be responsible for decrypting various sets of data (e.g., columns and/or records) within a file.

Per block 314, the database manager or operating system may permanently delete (e.g., hard delete, destroy, overwrite, etc.) the data in the first file, which may include the indexes. Accordingly, the database manager or operating system may overwrite the binary values that makeup the data in the first file, as opposed to flagging the data as deleted or deleting the pointers to the values. The database manager or operating system may further overwrite the values within a corresponding index. Permanently deleting the data may be useful for various reasons. For example, permanently deleting data may free up storage space within a storage device (e.g., disk) such that other data may be stored to the storage device. Further, even if a security key has been deleted, permanently deleting data may ensure that destroyed data will never be recovered even if someone discovered and copied a security key before it was destroyed.

Per block 316, the database manager or operating system may delete one or more transaction log entries, snapshot entries, and/or backup file entries that are associated with the first set of data on the first file. In some embodiments a database management system may include transaction log entries, snapshot entries, and/or backup file entries that may be partitioned. If these entries may be partitioned then the entries that correspond to deleted or destroyed data may be the only entries that are deleted from the transaction log, snapshot entry, and/or backup file entries. Accordingly, the transaction logs, snapshots, and/or backup files may continue to be utilized for data recovery or reporting. In some embodiments, however, the transaction logs and/or snapshots may not be able to be partitioned. In these embodiments, the entire transaction logs and/or snapshots may be completely deleted (e.g., every entry is deleted or the entire file is deleted). As discussed above, deleting the transaction logs, snapshots, and/or backup files may ensure complete data destruction such that there is no trail of data anywhere in a database system. In some embodiments, data within one or more entries of the transaction log, snapshot, and/or backup file may be permanently deleted (e.g., overwritten, hard deleted, destroyed, etc.).

In some embodiments, database management systems include indexes of transaction log files. Accordingly, for example, part of the data instruction process may include deleting one or more transaction log entries corresponding to data that needs to be destroyed. Therefore, if one or more transaction log entries within an index is deleted, the corresponding transaction log entry within a transaction log may also be deleted.

In some embodiments, the database manager may delete snapshot entries that correspond to data within a source database by deleting entries within a sparse file. Snapshots may utilize sparse files. Every time a record or value within a source database (e.g., database files 120 of FIG. 1) is changed or updated, a corresponding entry or page of the old value or record that will be changed is written to a sparse file while the updated or new value is written to the source database. A database sparse file may be a file in which data is appended to upon a source database change. Accordingly, for example, once an operation to permanently delete data is initiated (e.g., block 314), the data may have been first inserted into the sparse file as an entry before the data was deleted within the source database. Upon the policy event that triggers data destruction, the database manager may locate not only the first set of data within a source database to permanently delete the data but the database manager may search within the sparse file and delete the corresponding entries or pages (e.g., drop the snapshot using Transact-SQL). Deleting snapshots may automated based on the policy event or user-initiated. For example, the user may issue the following instruction: "DROP DATABASE database_snapshot_name [, . . . n]", where "database_snapshot_name" is the name of the snapshot that is to be dropped. In some embodiments, once a request to destroy data is made or a policy event is triggered, which could be different than a standard delete operation, the database manager may be configured to not write an entry of the change within a sparse file. This may avoid the extra work and processing it takes to not only generate an entry within the sparse file but delete the sparse file entry.

Per block 318, the database manager (e.g., index manager 207 of FIG. 2) may rebuild the indexes at the second file, as described above. The rebuilding of the indexes is further described below. Per block 320, the file manager and/or database manager may update the storing of metadata concerning the security keys (e.g., updating the key data store 126 of FIG. 1). For example, after permanently deleting the second security key, the file manager may record in a key data store a date and time of the deletion of the second security key or the event that triggered data destruction (e.g., whether it was a user request or the particular policy event). The updating the storing of metadata concerning the security key is described in more detail below.

Figure 4:
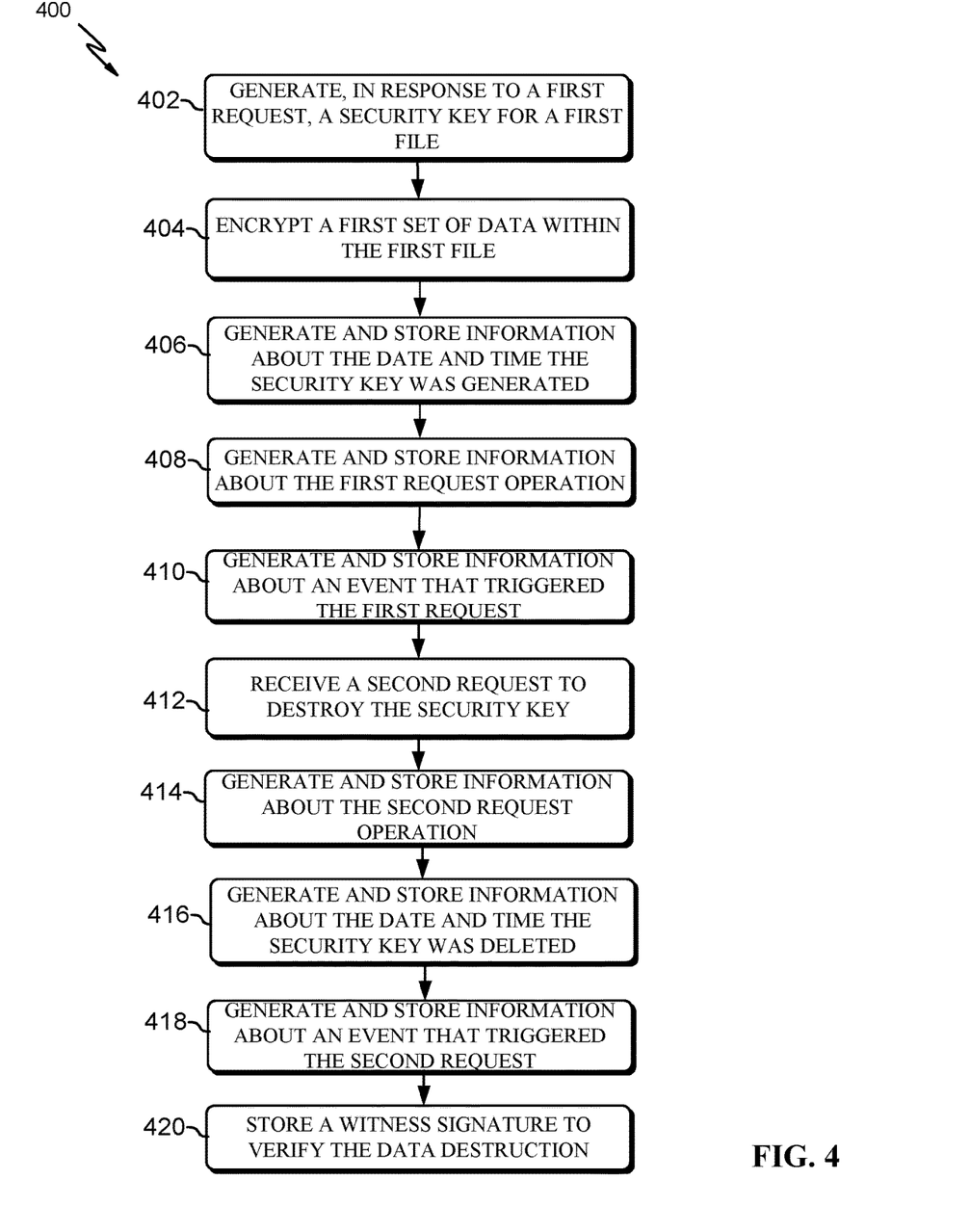
FIG. 4 is a flow diagram of an example lifecycle of a security key and the recording of metadata about the security key to provide an audit trail for data destruction, according to embodiments.

FIG. 4 is a flow diagram of an example lifecycle of a security key and the recording of metadata about the security key to provide an audit trail for data destruction. An "audit trail" as disclosed herein may be a history of actions associated with security keys or data destruction that is recorded in order to verify data destruction and/or determine the status of a particular security key. In some embodiments, some or all of the metadata information as specified in process 400 may be recorded within the data file itself (e.g., within mode blocks) instead of or in addition to separate key data stores (e.g., key data store 126 of FIG. 1).

The process 400 may, in some embodiments, begin at block 402 when a cryptosystem generates, in response to a first request, a security key for a first file. For example, a system administrator may desire to encrypt an entire file that includes sensitive information and therefore request that a security key be generated. Per block 402, the database manager may then then encrypt the first set of data with the security key (e.g., that is stored within the key data store 126).

Per block 406, a file manager or database manager may generate and store information about the date and time the security key was generated. For example, within a key data store (e.g., the key data store 126 of FIG. 1) a file may include a record of each security key utilized by a database and various columns of metadata about the security key. One of the columns may include a date/and or time column such that the date (e.g., including day, month, and/or year) and time may be written to the file of the corresponding key record to indicate when the security key was generated.

Per block 408, the file manager (e.g., file manager 132 of FIG. 1) or database manager may generate and store information about the first request operation. For example, the key store file may include a column value that describes the operation type (e.g., generate key, destroy key, update key, etc.) of the last request. For example, the first request was a request to generate the key. Consequently, values corresponding to the request to generate the key may be written to the column. In some embodiments, only the last request operation for any security key may be recorded (e.g., stored within the key data store 126 of FIG. 1). In some embodiments, every request operation for any security key may be recorded so as to provide a history of operation request types.

Per block 410, the file manager or database manager may generate and store information about an event that triggered the first request. The event may be a policy event and/or user request that triggers the first request to generate a security key. For example, the event that triggers the first request may be based on a user request to generate a security key because the user desires to encrypt data within a file. Alternatively, the event that triggers the first request to generate the security key may be based on a policy event. For example, if on a second file, a data destruction was initiated or triggered based on a policy event, the data that does not need to be destroyed may be copied to the first file and a new security key is generated automatically for the first file without a user request. Accordingly, the generation of the new security key may be in response to the policy event being triggered. In some embodiments, even when a user issues a request to destroy data on the second file (instead of the data destruction being initiated by a policy event), this request may be the event that triggers the first request to generate the security key for a first file.

In some embodiments, the security key may be subject to various other requests and/or operations before block 412 occurs. For example, a request may be made to read the security key at another time in order to decrypt the first set of data with the security key for data access. In these cases, an authorized user may desire to either read or modify the first set of data. Accordingly, the security key may be accessed in order to decrypt the data and transmit it to the authorized user upon authentication. In some embodiments, after the request to read the security key in order to decrypt the first set of data is made, other metadata information may be recorded or stored. For example, information about the date and time the security key was read may be generated and stored, information about the particular request operations may be generated and stored (e.g., recording that the particular "read" operation and/or a particular transaction (e.g., via a transaction ID) associated with the read operation occurred at a specific time), and information about the event that triggered the read operation may be generated and stored. In some embodiments, only an operation associated with a latest request for the security key is logged. In other embodiments, the system may log each operation of each request for the security key regardless of whether the request was a latest request. Accordingly, a history of requests and/or transaction IDs for the security key may be logged.

In some embodiments, the same security key that was utilized to encrypt the first set of data per block 404 may be the same security key utilized to decrypt the first set of data for a particular read operation of a key (for reading or modifying data: update, delete, insert, etc. of the first set of data). In some embodiments, however, the security key used to decrypt the first set of data may be different that the security key utilized to encrypt data, based on the cryptosystem utilized. For example, the cryptosystem may include an asymmetric keying system. In an example illustration, the user's computing device may store a public key and an ID (e.g., password) that is transmitted to a server computing device (e.g., server computing device 112 of FIG. 1). The server computing device may then utilize its private key to decrypt the request and decrypt the first set of data on the first file upon successful authentication. In some embodiments, the asymmetric keying system may be a digital signature system. In these embodiments, the user may issue a request that is hashed. The hash may then be encrypted with the user's private key. The user's request, ID, and hash may then be transmitted over a network. The server computing device that receives the hash may decrypt the hash with the user's public key. The server computing device may then compare the hash with the message to determine whether there was any security tampering (e.g., whether someone eavesdropped on the message). The server computing device may then decrypt the first set of data within the first file with the user's public key or its own generated security key, depending on successful authentication. In some embodiments, the user's computing device and the server computing device may share a symmetric key. In these embodiments, the user may transmit an ID and a request message, which is encrypted by the symmetric key before it is transmitted to the server computing device. The server computing device may authenticate by receiving the ID and decrypting the message with the shared symmetric key. The server computing device may then decrypt the first set of data within the first file using the shared symmetric key or another dedicated security key depending on successful authentication. In some embodiments, a Public Key Infrastructure (PKI) authentication system may be utilized. The cryptosystem may include any of the keying systems specified above or any other keying systems used for encrypting and/or decrypting the first set of data within the file.

Per block 412, the database manager or operating system may receive a second request to destroy (e.g., hard delete, overwrite, etc.) the security key. Block 412 may occur in response to a user request or a policy event that has triggered the initiating of a destroying of data corresponding to the security key. The operating system and/or database manager may then destroy the security key. In response to the destroying of the security key, a file manager and/or database manager may then, per block 414, generate and store information about the second request operation to verify the data destruction. For example, as described above, the transaction ID associated with the second request (which may be the latest request) along with the particular operation "delete" for the particular data may be written to a key store in order to verify the data destruction. Per block 416, the database manager or file manager may further generate and store information about the date and time the security key was deleted. Per block 418, the database manager or file manager may also generate and store information about an event that triggered the second request. For example, the event that triggered the second request may have been a user request to destroy a set of data. Information describing the event itself (e.g., a "destroy data" query request) may be stored to a data store to help provide the audit trail. Alternatively, a policy event, may have triggered the second request to destroy the first set of data. The information that describes the policy event (e.g., close of X investigation) may therefore be stored to the data store in order to help provide the audit trail. The storing of information about what data was deleted in order to verify data destruction may exclude storing information of the actual data since the actual data should not exist (e.g., per block 412).

Per block 420, the database manager and/or file manager may receive and store a witness signature to verify the data destruction of the first set of data. In some embodiments, a user may issue a request to sign or the database manager (or file manager) may prompt or notify the user to sign a particular field to verify that he or she has witnessed the data or security key destruction or attest that the data or security key has indeed been destroyed. For example, as described above, a column on a table of a file within a data store may be a "witness signature" column. And for a particular security key or record corresponding with the security key, the witness may sign the corresponding field within the witness signature column for that security key or record. The witness signature may be generated in any suitable manner. For example, the user may type characters within the field (e.g., type the user's initials, name, etc.), the user may utilize hand gestures for handheld devices (e.g., mobile phone), utilize voice activation command systems and natural language processing (e.g., the user speaks his or her name, which is then stored to the witness signature field), electronic signatures, or any other suitable manner to verify that a particular person has witnessed or can attest to the destruction of the first set of data.

Figure 5A:
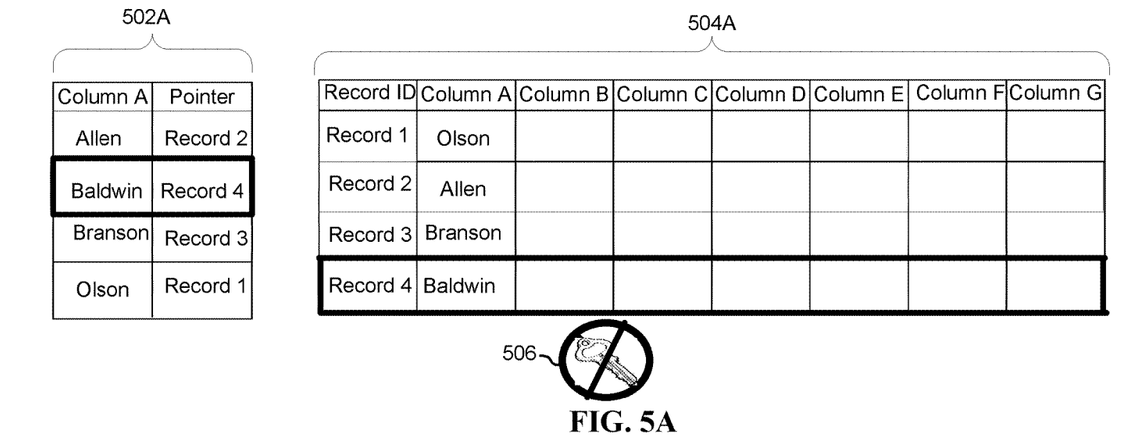
FIG. 5A is a diagram of a database table and associated index that is subject to data destruction, according to embodiments.

FIG. 5A is a diagram of a database table 504A and associated index 502A that is subject to data destruction. The table 504A (and the index 502A) may correspond to a data structure within a data (primary or source) file. The table 504A may include a plurality of columns, such as a record ID (RID) column (which may correspond to a key column), column A, column B, column C, column D, column E, column, F, and column G. There may also be four records—Record 1, Record 2, Record 3, and Record 4. Column A may correspond to a last name column, which includes the values of Olson, Allen, Branson, and Baldwin. The index 502A may correspond to the column A. The names within column A of the index 502A may be organized alphabetically, as illustrated within the index 502A—Allen, Baldwin, Branson, and Olson. The index 502A may also include a pointer column that includes the values of records 2, 4, 3, and 1. The pointers may be utilized by a database management system to reference the corresponding values within the database table 504A. For example, for the value of Baldwin within the index 502A, the associated pointer value is "Record 4," which means that if a request for Baldwin is made, the database manger may quickly locate Baldwin within the database table 504A via the alphabetically organized index 502A and specifically through the pointer value of "Record 4".

FIG. 5A may be illustrative of a record that needs to be destroyed. As illustrated by the dark black lines, the "Record 4," that includes the value of "Baldwin" may need to be destroyed. As described above, Record 4 may either be requested by a user to be deleted (e.g., via hard delete) or a policy event may occur to trigger the destruction of Record 4. In some embodiments, as illustrated in FIG. 5A, data destruction of the Record 4 may include destruction of the security key 506. In some embodiments, the security key 506 may be associated only with Record 4 such that it is the only security key that can decrypt data within the Record 4. Accordingly, if the security key 506 is deleted, then only Record 4 may remain in an indefinite encrypted state, but not Records 1, 3, or 4. In other embodiments, however, the security key 506 may correspond to the entire file (e.g., the entire database table 504A) such that it is the only security key utilized to decrypt all of the data within the database table 504A. Accordingly, if the security key 506A is destroyed, then all of the data within the database table 504A and/or the index 502A may remain encrypted, not just the data within Record 4.

Figure 5B:
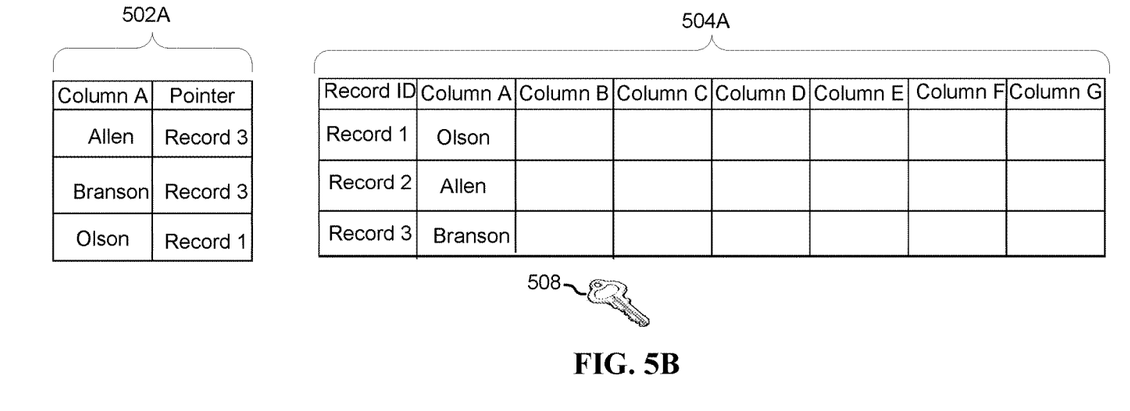
FIG. 5B is a diagram of the database table and associated index of FIG. 5A after Record 4 has been deleted, according to embodiments.

FIG. 5B is a diagram of the database table 504A and associated index 502A of FIG. 5A after Record 4 has been deleted. Accordingly, FIG. 5B illustrates that there are only 3 records (Record 1, Record 2, and Record 3) instead of 4 records as illustrated in FIG. 5A and that each of the 3 records have been copied from a first file (FIG. 5A) to a second file (FIG. 5B). In some embodiments, the data gathered within database table 504A and/or index 502A of FIG. 5B may have been gathered from a snapshot, backup file, and/or transaction log (e.g., prior to a point in time that Record 4 with the value of "Baldwin" was inserted). Accordingly, in some embodiments, the Record 4 within FIG. 5A may be destroyed and in response to the deleting of the data, the database manager may restore a database (e.g., via a snapshot and/or applying transaction logs) (e.g., to a point prior to the time Record 4 was inserted). It follows that, in some embodiments, the database manager identifies the Records 1, 2, and 3 within a first file of FIG. 5A, which do not need to be destroyed. The database manager may then copy, apply, and/or generate Records 1, 2, and 3 either from the first file in FIG. 5A, a snapshot (sparse) file, and/or a transaction log to a second file corresponding to FIG. 5B. The security key 508 may be generated before the security key 506 is destroyed so that the data copied to the database table 504A within FIG. 5B will not be indefinitely encrypted from the destroying of security key 506. The security key 508 may be utilized to encrypt and/or decrypt data for one or more portions of an associated file.

In some embodiments, the index 502A of FIG. 5B may need to be rebuilt. Rebuilding may include the process of receiving the root node index keys (e.g., via the index manager 207 of FIG. 2), the intermediate level index keys, and the sorted leaf node level keys and generate a corresponding index by generating a corresponding root node, intermediate level, and leaf nodes for various columns, as described above. The index manager may also update or store corresponding values within the pointer columns of an index such that the index may reference the appropriate records within the database table 504A of FIG. 5B for data access. In other embodiments, however, the indexes may not need to be rebuilt, as a snapshot (as described above) may include an index and its corresponding values.

FIG. 6 is a block diagram of a computing device 600 that includes the cryptosystem 116, the file manager 132, and the database manager 114 of FIG. 1, according to embodiments. The components of the computing device 600 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 600 may include one or more general-purpose programmable central processing units (CPUs) 06A and 06B, herein generically referred to as the processor 06. In an embodiment, the computing device 600 may contain multiple processors; however, in another embodiment, the computing device 600 may alternatively be a single CPU device. Each processor 06 executes instructions stored in the memory 12 (e.g., the cryptosystem 116 and the file manager 114 instructions).

The computing device 600 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 600, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The I/O device interface 22 provides an interface to any of various other I/O devices or devices of other types, such as printers or fax machines. The network interface 24 provides one or more communication paths from the computing device 600 to other digital devices and computer systems.

Although the computing device 600 shown in FIG. 6 illustrates a particular bus structure providing a direct communication path among the processors 06, the memory 12, the bus interface 08, the display system 04, and the I/O bus interface unit 14, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 600, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device. The computing device 600 may be the client computing device 102 of FIG. 1 and/or the server computing device 112 of FIG. 1.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 600, and may also include the virtual memory of other computer systems coupled to the computing device 600 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data shown in FIG. 6. These programs and data are illustrated in FIG. 6 as being included within the memory 12 in the computing device 600; however, in other embodiments, some or all of them may be on different computer systems and may be accessed remotely, e.g., via a network 30. The computing device 600 may use virtual addressing mechanisms that allow the programs of the computing device 600 to behave as if they only have access to a large, single storage entity instead of access to multiple, smaller storage entities. Thus, while the components and data shown in FIG. 6 are illustrated as being included within the memory 12, these components and data are not necessarily all completely contained in the same storage device at the same time. Although the components and data shown in FIG. 6 are illustrated as being separate entities, in other embodiments some of them, portions of some of them, or all of them may be packaged together.

In some embodiments, the memory 12 may include program instructions or components, such as the cryptosystem 116, the file manager 132, and/or the database manager 114 of FIG. 1. The cryptosystem 116 in some embodiments may include a keying system 46 and an encryption engine 50. The keying system 46 may include various keying systems, such as symmetric, asymmetric, digital signature, or any other keying systems for encrypting and/or decrypting data according to various encryption policies. The encryption engine 50 may utilize any encryption algorithm. For example, the algorithm may be an asymmetric algorithm type, such as RSA, DH, PGP or other algorithms. The asymmetric algorithm may be utilized with asymmetric keys. In an alternative embodiment, the algorithm type may be a symmetric algorithm that is meant to be utilized with a symmetric key. The symmetric algorithm may be any number of algorithms such as triple DES, IDEA, AES, or other algorithms.

As described above, the file manager 132 may be responsible for managing various security keys, files, and/or check for various policy events or rules that trigger a data destruction operation. As described above, the database manager 114 may be responsible for identifying data on a file that does not need to be destroyed, copying the data to a second file, permanently deleting data in a data file, deleting one or more transaction log entries, snapshot entries, and/or backup file entries, rebuilding indexes, etc.

In an embodiment, the components and data shown in FIG. 6 (e.g., cryptosystem 116 and/or file manager 114) may include instructions or statements that execute on the processor 06 or instructions or statements that are interpreted by instructions or statements that execute on the processor 06 to carry out the functions as further described below. In another embodiment, the components shown in FIG. 6 may be implemented in hardware via semiconductor devices, chips, logical gates, circuits, circuit cards, and/or other physical hardware devices in lieu of, or in addition to, a processor-based system. In an embodiment, the components shown in FIG. 6 may include data in addition to instructions or statements.

FIG. 6 is intended to depict representative components of the computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for verifying data destruction in a database, the method comprising:
   determining, by a computing device, that a policy event to initiate data destruction for a first set of data has been triggered, the first set of data located on a first file;
   identifying, by the computing device, a second set of data on the first file that does not need to be destroyed;
   copying, in response to the identifying and prior to the deleting of a first security key, the second set of data to a second file;
   generating, in response to the copying and prior to the deleting of the first security key, a second security key for the second file;
   encrypting, in response to the generating, the second set of data with the second security key;
   deleting, by the computing device and in response to the determining, the first security key used for decrypting the first set of data; and
   deleting, by the computing device and in response to the determining, one or more transaction log entries associated with the first set of data, wherein the one or more transaction log entries include a copy of the first set of data, and wherein the one or more transaction log entries are a part of a transaction log, the transaction log being a second file that stores a history of each data change within the database.

2. The method of claim 1, further comprising permanently deleting, by the computing device, the first set of data by overwriting the first set of data.

3. The method of claim 1, further comprising deleting, by the computing device, a snapshot page associated with the first set of data and a backup file entry associated with the first set of data.

4. The method of claim 1, further comprising storing metadata concerning the one or more security keys, the metadata including at least a date and time of when the one or more security keys were generated and an event that triggered the generating of the one or more security keys.

5. The method of claim 1, further comprising storing information about what data was deleted in order to verify the data destruction, the information excluding the first set of data.

6. The method of claim 5, wherein the storing of the information includes storing metadata concerning the one or more security keys, the metadata including at least a witness signature, wherein the witness signature is a mark that a user generates in order to verify the data destruction of the first set of data.

7. The method of claim 1, wherein the policy event is based on a particular date or a particular time.

8. The method of claim 5, wherein the storing of the information includes storing metadata concerning the one or more security keys.

9. The method of claim 1, further comprising permanently deleting, by the computing device, the first set of data by overwriting the first set of data.

10. A computer-implemented method for verifying data destruction in a database, the method comprising:
    determining, by a computing device, that a policy event to initiate data destruction for a first set of data has been triggered, the first set of data located on a first file;
    deleting, by the computing device and in response to the determining, a first security key used for decrypting the first set of data;
    deleting, by the computing device and in response to the determining, one or more transaction log entries associated with the first set of data, wherein the one or more transaction log entries include a copy of the first set of data, and wherein the one or more transaction log entries are a part of a transaction log, the transaction log being a second file that stores a history of each data change within the database;
    generating a prompt instructing a user to attest that the first set of data has been destroyed, the prompt including requesting that the user generate a witness signature;

transmitting, over a network, the prompt to a second computing device associated with the user; and receiving, over the network, the witness signature from the second computing device and store the witness signature to a signature column field of the database.

11. The method of claim 1, further comprising:

identifying, by the computing device, a second set of data on the first file that does not need to be destroyed;

copying, in response to the identifying and prior to the deleting of the first security key, the second set of data to a second file;

generating, in response to the copying and prior to the deleting of the first security key, a second security key for the second file; and encrypting, in response to the generating, the second set of data with the second security key.

12. The method of claim 1, further comprising deleting, by the computing device, a snapshot page associated with the first set of data and a backup file entry associated with the first set of data.

13. The method of claim 1, further comprising storing metadata concerning the one or more security keys, the metadata including at least a date and time of when the one or more security keys were generated and an event that triggered the generating of the one or more security keys.

14. The method of claim 1, further comprising storing information about what data was deleted in order to verify the data destruction, the information excluding the first set of data.

15. The method of claim 1, wherein the policy event is based on a particular date or a particular time.

* * * * *